(12) United States Patent
Chapman et al.

(10) Patent No.: US 10,836,547 B2
(45) Date of Patent: Nov. 17, 2020

(54) AIR-TIGHT STORAGE CONTAINER SYSTEM

(71) Applicants: Dean Chapman, Montclair, NJ (US); Andrew Reeves, Brooklyn, NY (US); Matthew Chin, New York, NY (US); Gaz Brown, Gardiner, NY (US); Irisa Xiong, Brooklyn, NY (US)

(72) Inventors: Dean Chapman, Montclair, NJ (US); Andrew Reeves, Brooklyn, NY (US); Matthew Chin, New York, NY (US); Gaz Brown, Gardiner, NY (US); Irisa Xiong, Brooklyn, NY (US)

( * ) Notice: Subject to any disclaimer, the term of this patent is extended or adjusted under 35 U.S.C. 154(b) by 62 days.

(21) Appl. No.: 16/296,485

(22) Filed: Mar. 8, 2019

(65) Prior Publication Data

US 2019/0276207 A1    Sep. 12, 2019

Related U.S. Application Data

(60) Provisional application No. 62/640,663, filed on Mar. 9, 2018.

(51) Int. Cl.
*B65D 51/16* (2006.01)
*B65D 53/02* (2006.01)
*A47J 47/02* (2006.01)
*B65D 51/24* (2006.01)
*B65D 39/12* (2006.01)

(52) U.S. Cl.
CPC ......... *B65D 51/1672* (2013.01); *B65D 39/12* (2013.01); *B65D 51/242* (2013.01); *B65D 53/02* (2013.01); *A47J 47/02* (2013.01)

(58) Field of Classification Search
CPC ............ B65D 51/1672; B65D 51/1694; B65D 39/12; B65D 51/242; B65D 53/02; B65D 45/327; A47J 47/02
USPC ............. 220/378, 212.5, 232, 234, 235, 236
See application file for complete search history.

(56) References Cited

U.S. PATENT DOCUMENTS

| | | | |
|---|---|---|---|
| 2007/0241107 A1* | 10/2007 | Matsumoto | B65D 39/12 220/238 |
| 2010/0084365 A1* | 4/2010 | Liu | B65D 39/12 215/317 |
| 2010/0282748 A1* | 11/2010 | Lu | B65D 39/12 220/260 |
| 2012/0285958 A1* | 11/2012 | Lee | B65D 45/327 220/235 |
| 2013/0037540 A1* | 2/2013 | Sze | B65D 43/022 220/237 |
| 2013/0240532 A1* | 9/2013 | Lu | B65D 39/12 220/378 |
| 2014/0284333 A1* | 9/2014 | Poon | B65D 43/26 220/318 |

(Continued)

*Primary Examiner* — J. Gregory Pickett
*Assistant Examiner* — Niki M Eloshway
(74) *Attorney, Agent, or Firm* — Stuart M. Goldstein

(57) ABSTRACT

An air-tight storage container system has a container having an open top and a container closure unit configured to be placed over the top. The closure unit has a series of stacked, interlocking components, including a handle member, a flexible deformable gasket member, a snap inner piece, and a bottom member. When these closure unit components are interconnected and the closure unit itself is positioned atop the container, the closure unit is pushed and rotated, held within the container to establish an air-tight seal within the container.

4 Claims, 15 Drawing Sheets

(56) References Cited

U.S. PATENT DOCUMENTS

2016/0257458 A1\* 9/2016 Pentelovitch .......... B65D 39/12
2017/0190479 A1\* 7/2017 Liu ........................ B65D 39/12

\* cited by examiner

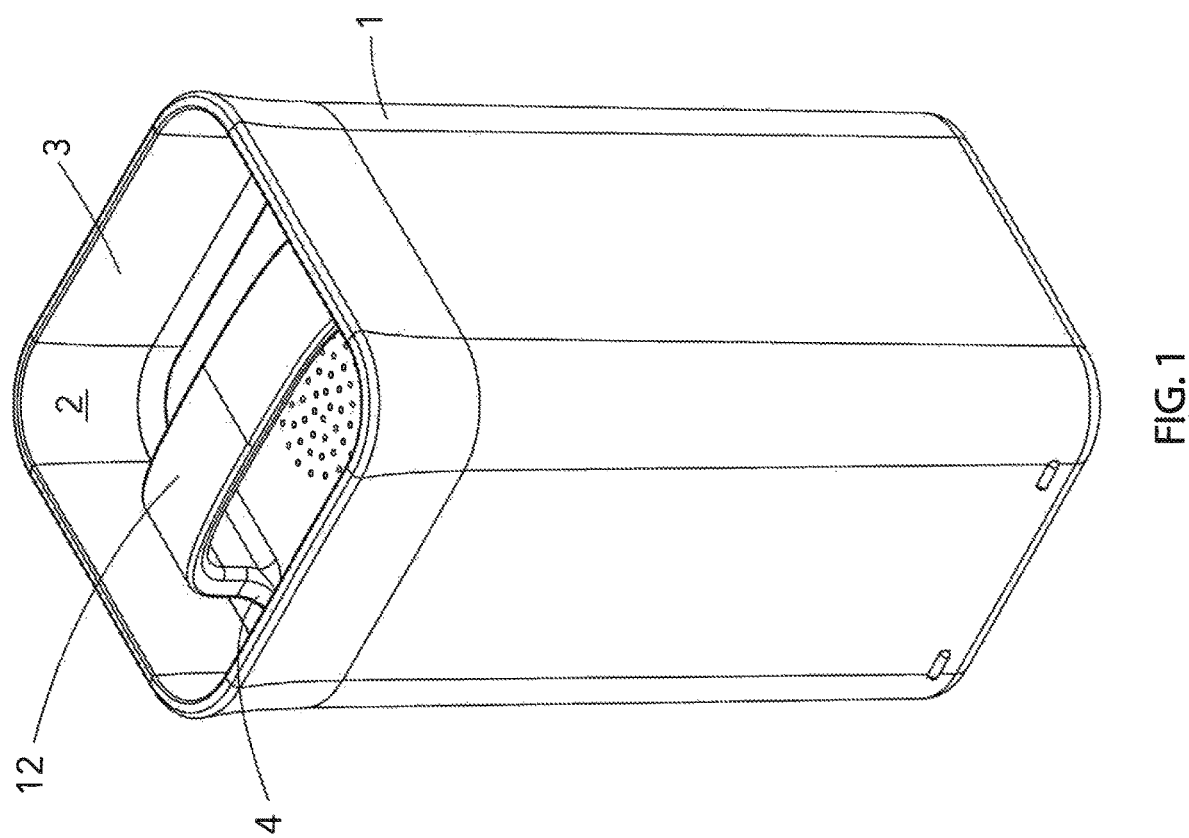

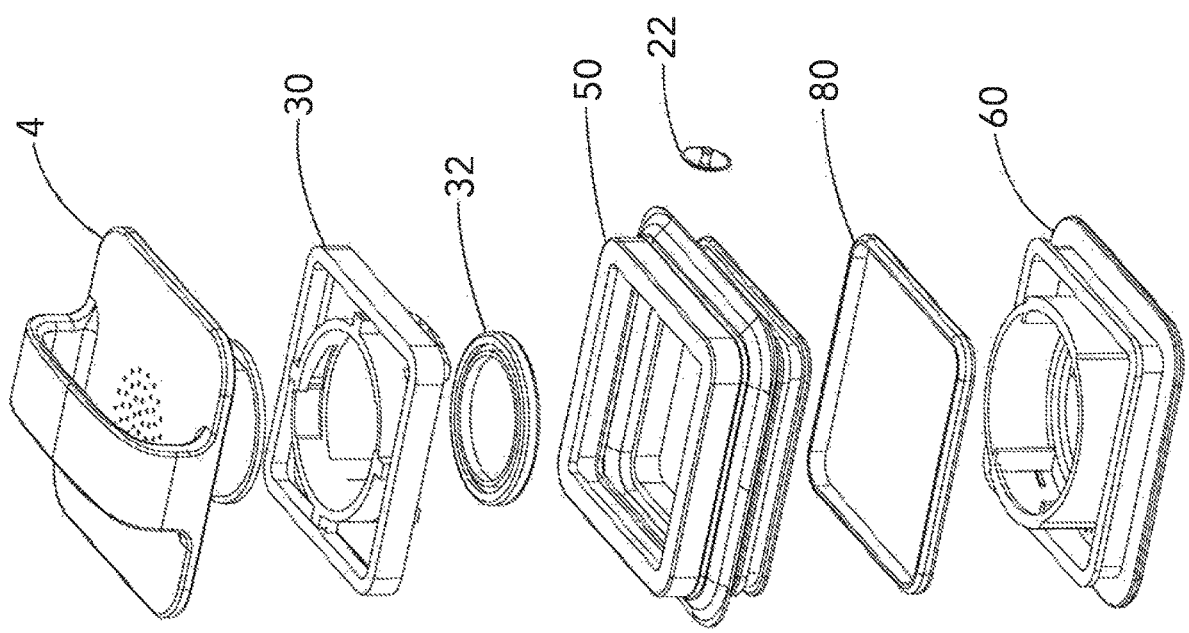

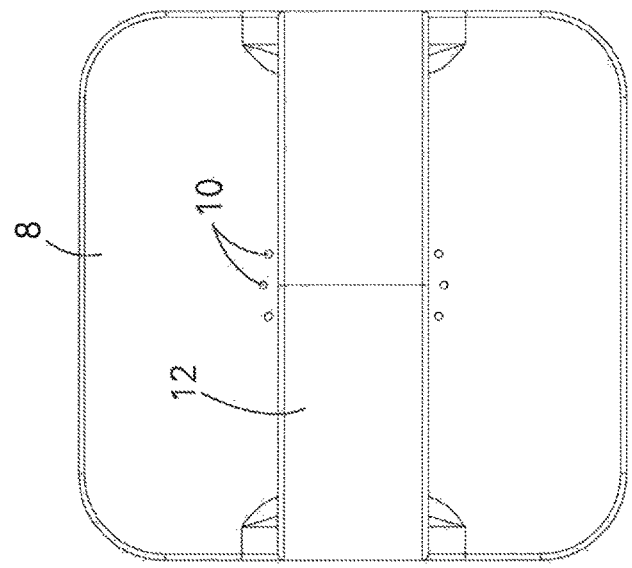
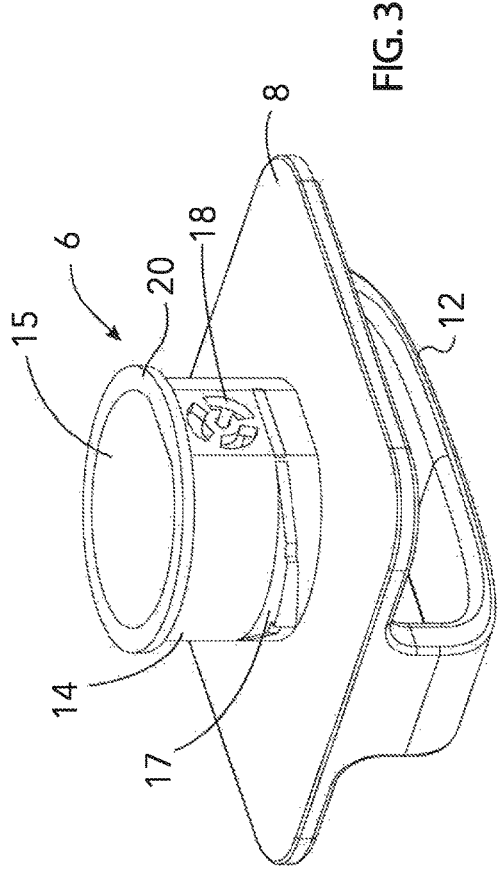
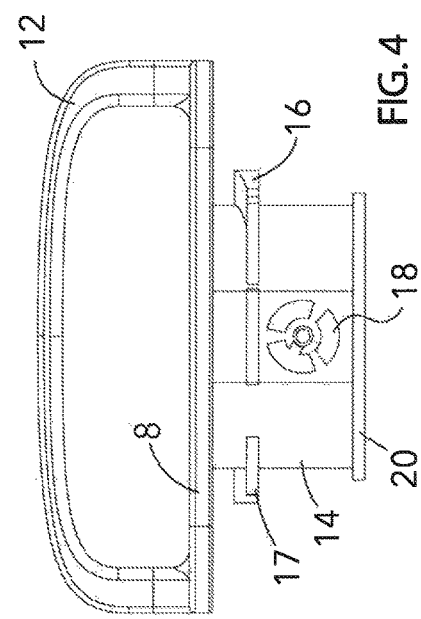

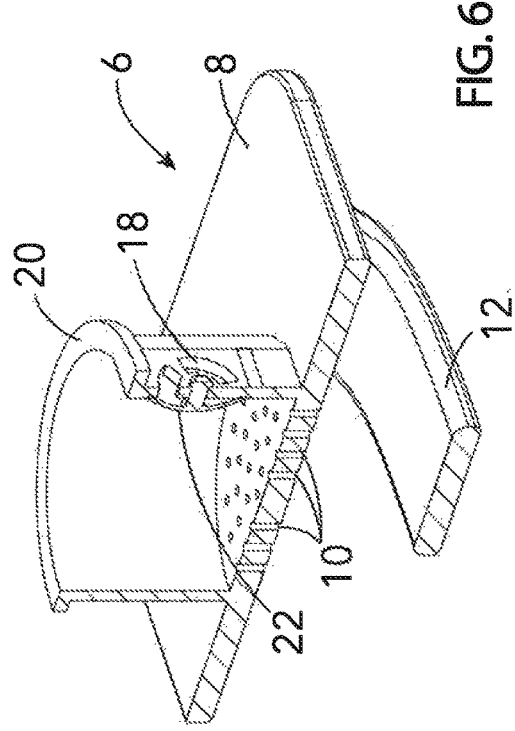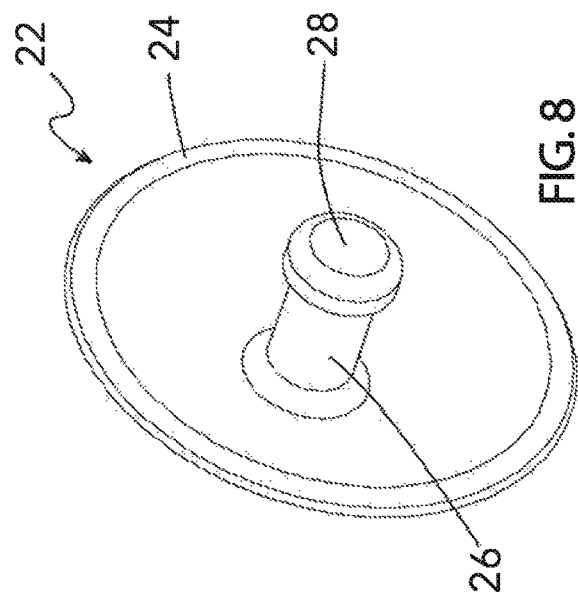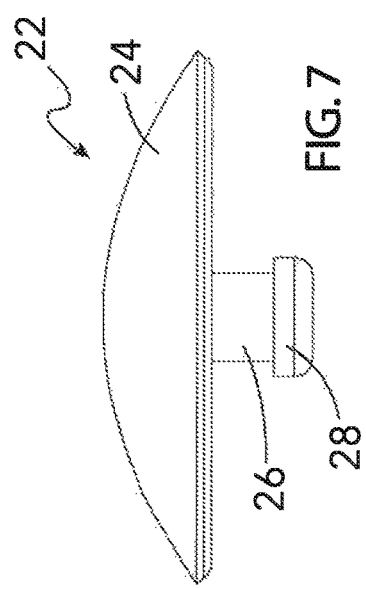

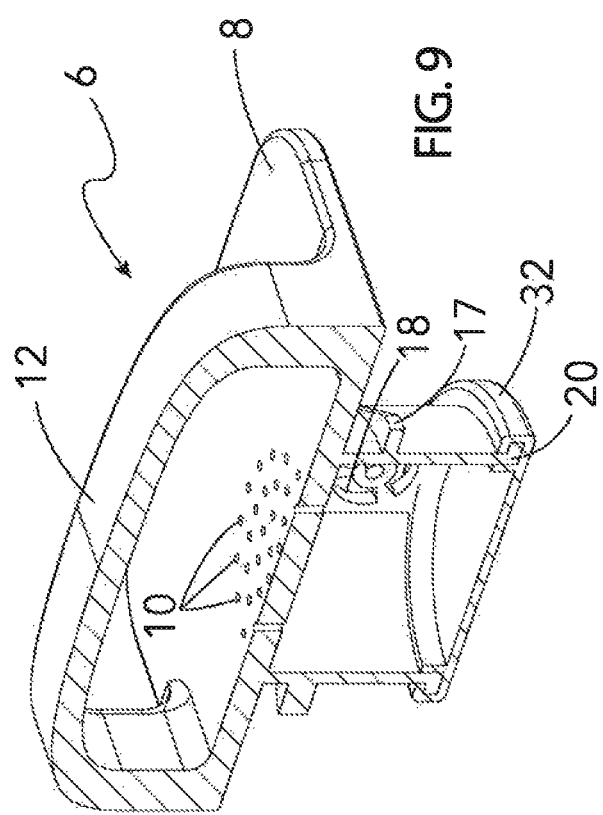

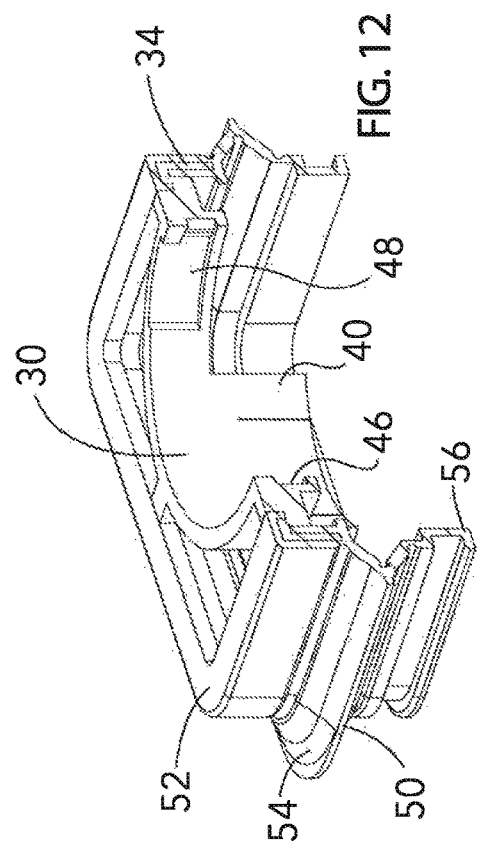
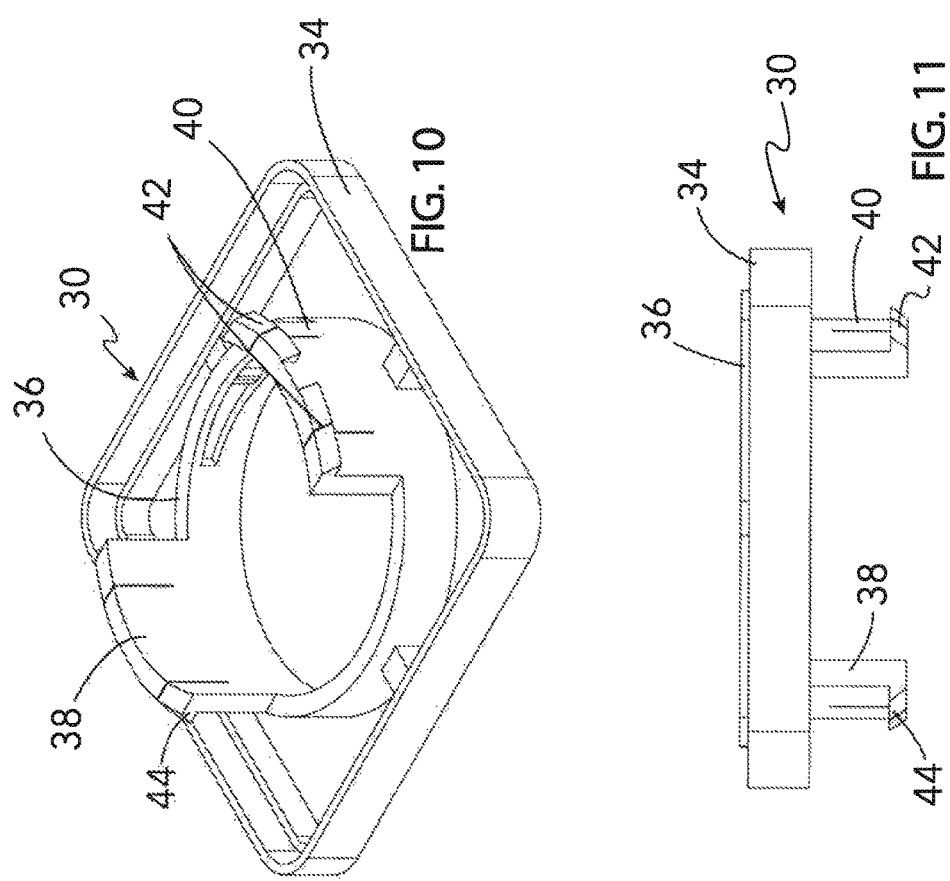

AIR-TIGHT STORAGE CONTAINER SYSTEM

RELATED APPLICATION

This application claims the benefit of provisional application Ser. No. 62/640,663, filed on Mar. 9, 2018.

BACKGROUND OF THE INVENTION

A food storage container normally comprises a base section defining a food storage space, and a separate top or lid which is screwed, snapped or otherwise secured over the top opening of the base in order to protect the food within the space. A lid which is tightly secured onto the top of a container is designed, in many cases, to establish an air-tight seal within the storage space. The object, of course, is to ensure that the food in the container remains as fresh as possible.

SUMMARY OF THE INVENTION

It is thus the object of the present invention to provide an air-tight storage container system which utilizes a unique container closure device to create an air-tight seal within the container.

This and other objects are accomplished by the present invention, an air-tight storage container system comprising a container having an open top and a container closure unit configured to be placed over the top. The closure unit has a series of stacked, interlocking components, including a handle member, a flexible deformable gasket member, a snap inner piece, and a bottom member. When these closure unit components are interconnected and the closure unit itself is positioned atop the container, the closure unit is pushed and rotated, held within the container to establish an air-tight seal within the container.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 1 shows the container and container closure unit of the storage container system of the present invention in use.

FIG. 2 is an exploded view of the components of the storage container system of the present invention.

FIG. 3 is a perspective view of the handle member of the storage container system of the present invention.

FIG. 4 is an elevation view of the handle member of the storage container system of the present invention.

FIG. 5 is a top view of the handle member of the storage container system of the present invention.

FIG. 6 is a partial cross-sectional view showing the connection of the valve and the handle member of the storage container system of the present invention.

FIG. 7 is an elevation view of the valve of the storage container system of the present invention.

FIG. 8 is a perspective view of the valve of the storage container system of the present invention.

FIG. 9 is a partial cross-sectional view of the handle member of the storage container system of the present invention.

FIG. 10 is a perspective view of the snap inner piece of the storage container system of the present invention.

FIG. 11 is an elevation view of the snap inner piece of the storage container system of the present invention.

FIG. 12 is a partial cross-sectional view of the inter-connection of the snap inner piece and the expandable gasket of the storage container system of the present invention.

DETAILED DESCRIPTION OF THE INVENTION

Figure 13:
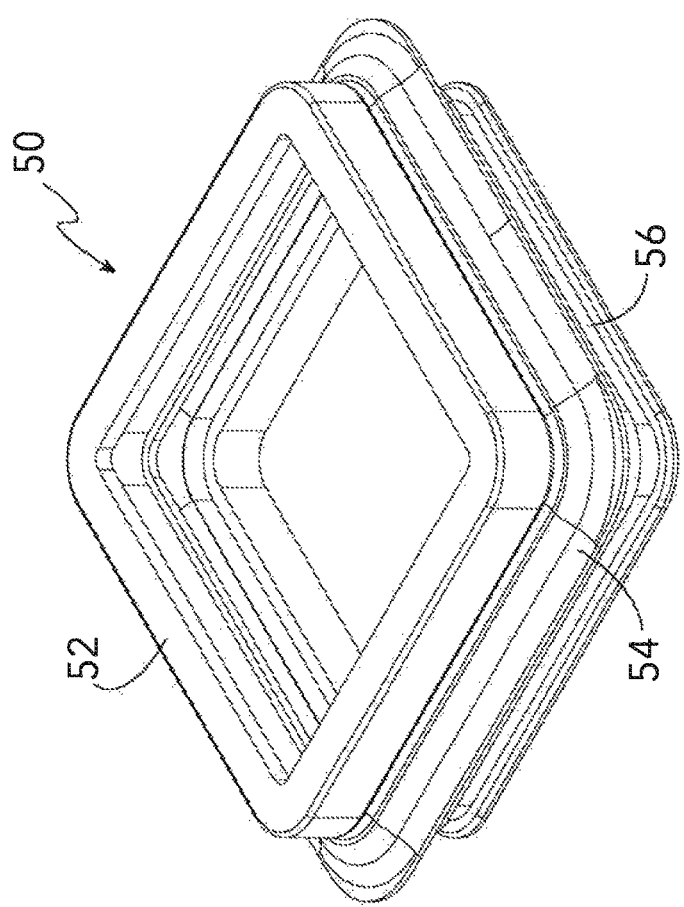
FIG. 13 is a top perspective view of the expanding gasket of the storage container system of the present invention.
Figure 14:
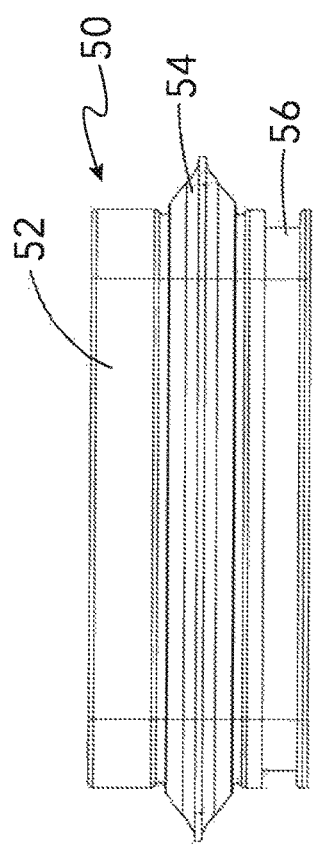
FIG. 14 is an elevation view of the expandable gasket of the storage container system of the present invention.
Figure 15:
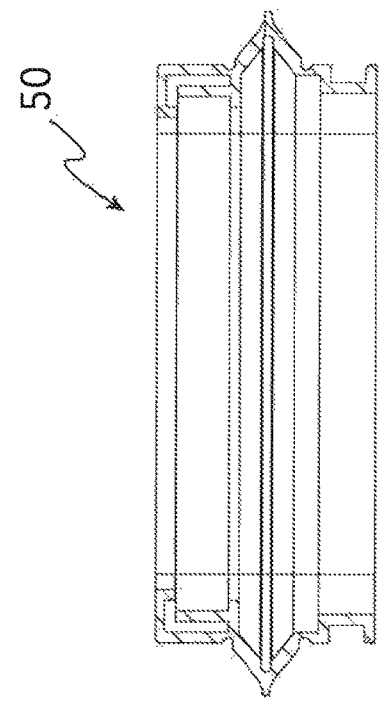
FIG. 15 is a cross-sectional view of the expandable gasket of the storage container system of the present invention.
Figure 18:
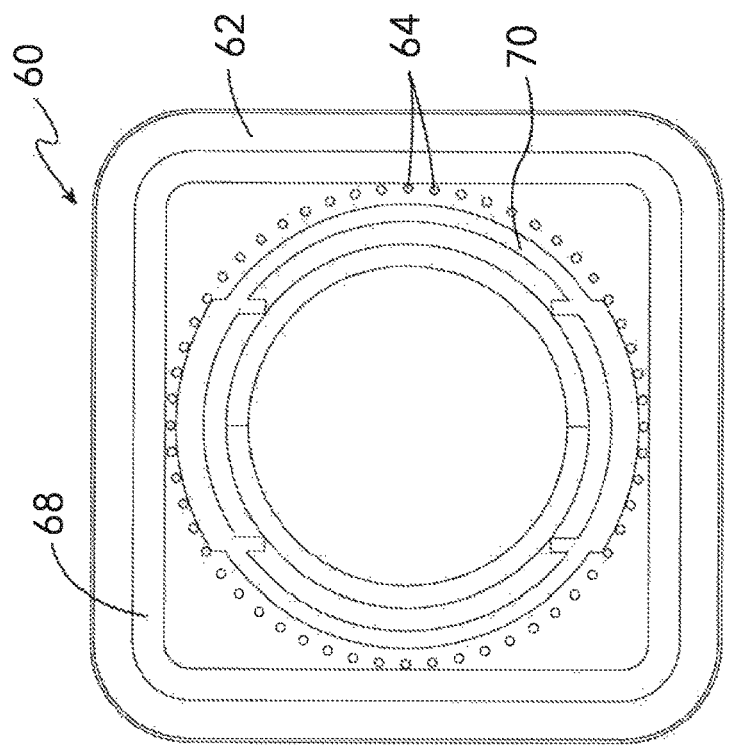
FIG. 18 is a top view of the bottom member of the storage container system of the present invention.

The air-tight storage container system of the present invention comprises container 1 with open top 2 and sidewalls 3, and container closure unit 4 configured to fit snugly into open top 2. Closure unit 4 is made up of handle member 6, inner snap piece 30, sealing gasket 32, expandable gasket 50, gasket band 80, and bottom member 60. These components are stacked and interlocked to form closure unit 4 into a compact, easy to use container top.

Handle member 6 comprises flat base 8 having through vent holes 10. Handle component 12 extends upwardly from base 8. Hollow lower section 14 having through passage 15 extends downwardly from base 8. Lower section 14 has cantilevered, ramp locks 16 and 17 extending from the side of the lower section, valve opening 18 extending through the side of the lower section, and flat support base 20 on the bottom of the lower section. Valve 22, comprising curved top 24 and stem 26 with end stop 28, is configured to be positioned within valve opening 18. Support base 20 is configured to extend into sealing gasket 32, as best seen in FIG. 9.

Snap inner piece 30 comprises outer rim 34 supporting and connected to inner section 36 having downwardly extending legs 38 and 40. Each leg has locking tabs 42 and 44. Inset, locking spaces 46 and 48 are configured to accept ramp locks 16 and 17 of handle member 6. Snap inner piece 30 is configured to be positioned within top section 52 of expandable gasket 50, as best seen in FIG. 12.

Expandable gasket 50 comprises top section 52, midsection 54, and bottom section 56. Gasket 50 is made of flexible, deformable material such as hard rubber or equivalent material.

Bottom member 60 comprises flat bottom base 62 with vent holes 64, inner section 66 with flat top portion 68, and center section 70. Inner section 66 and center section 70 extends up from bottom base 62. Inner section 66 has flat top portion 68. Center section 70 has locking elements 72 and 74 which are configured to engage locking tabs 42 and 44 of snap inner piece 30, as will be discussed further in detail below. Supports 76 protrude outwardly from and into the interior space of center section 70.

Figure 19:
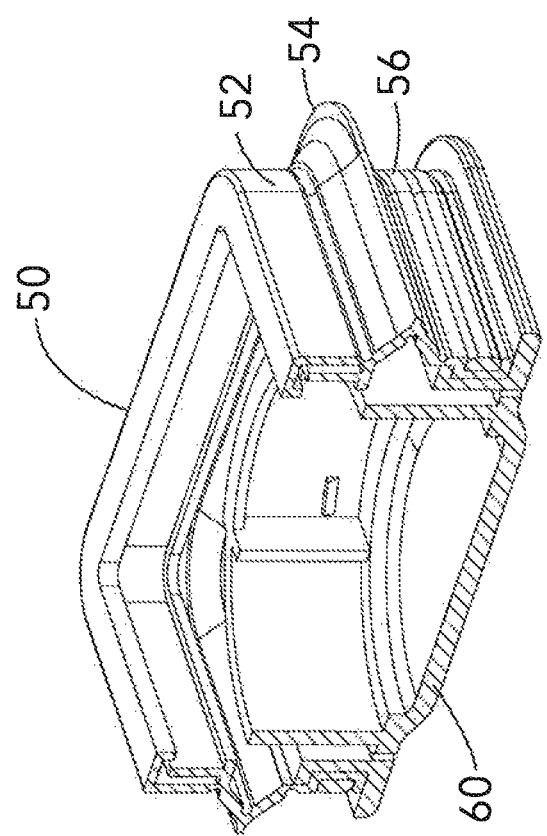
FIG. 19 is a partial, cross-sectional perspective view of the inter-connection of components of the lower portion of the container closure unit of the storage container system of the present invention.

FIG. 19 is a partial cross-sectional view of the lower portion of container closure unit 4, showing the manner in which bottom member 60 is interlocked and held in place within expandable gasket 50.

Figure 20:
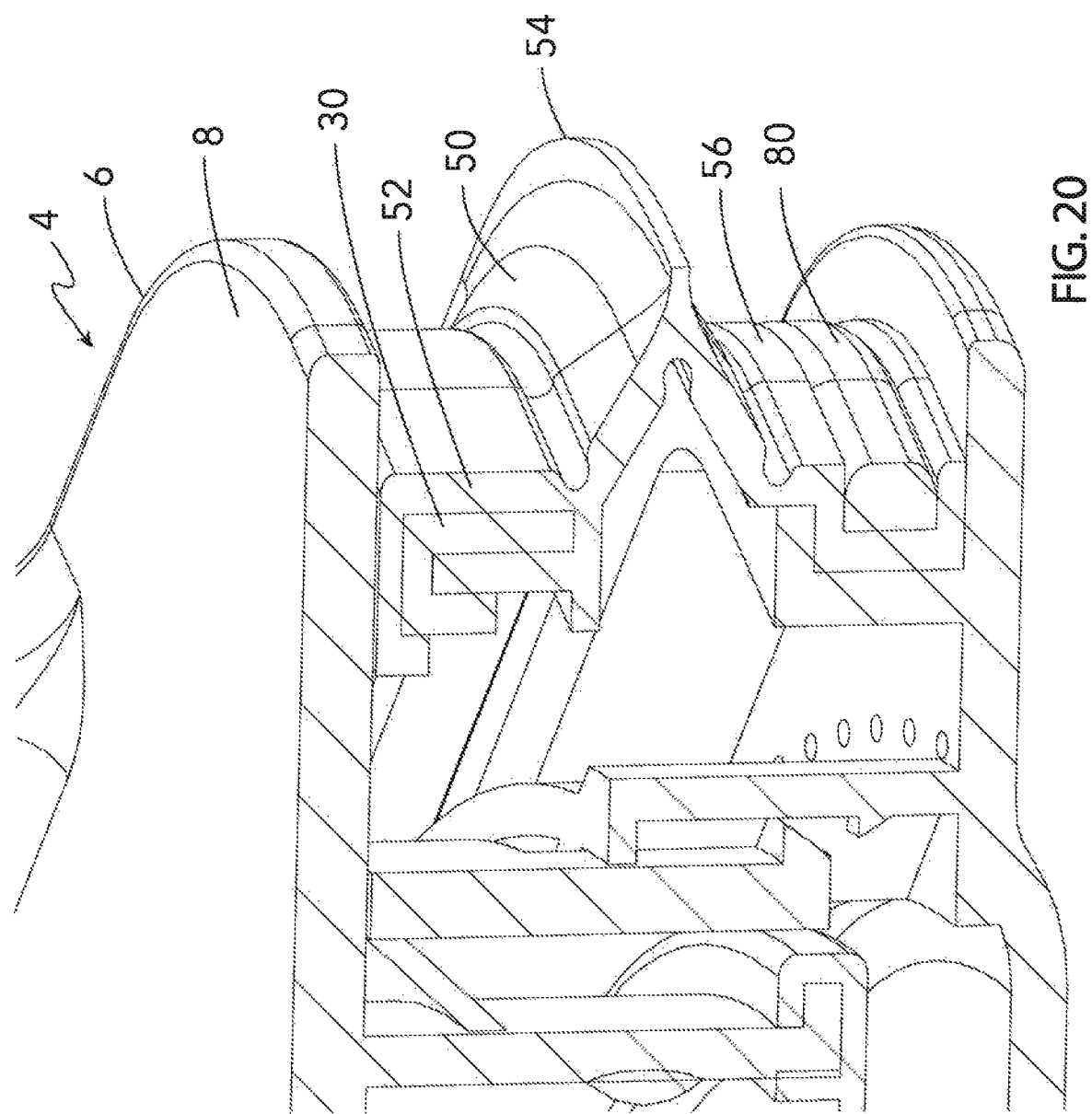
FIG. 20 is a close-up, partial cross-sectional view of the inter-connection of components at an end of the container closure unit of the storage container system of the present invention.

FIG. 20 is a partial cross-sectional view of an end portion of container closure unit 4, showing the relationship between expandable gasket 50 and handle member 6, inner snap piece 30, and bottom member 60 and gasket band 80. Top section 52 of expandable gasket 50 is held between flat base 8 of handle member 6 and inner snap piece 30, when the handle member is quarter-turned in place, as will be discussed further in detail below. Bottom section 56 of expandable gasket 50 is held in place on bottom member 60 by gasket band 80.

Figure 21:
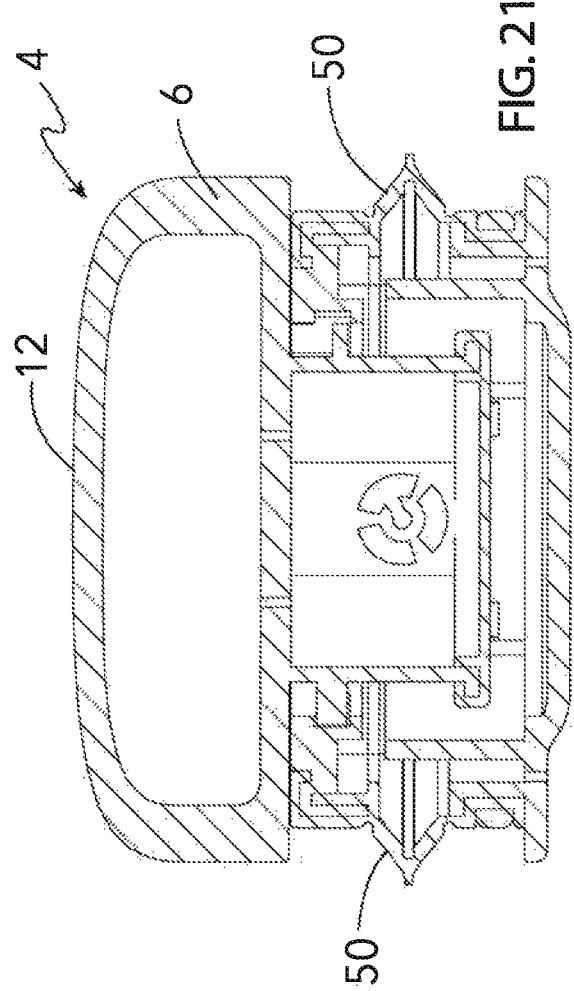
FIG. 21 is a cross-sectional view of the assembled container closure unit of the storage system of the present invention in the open position.

FIG. 21 is a cross-sectional view of container closure unit 4 in a first, open position, that is with handle member 6 placed on the lower portion of the closure unit, with expandable gasket 50 in an expanded configuration merely grazing the interior surfaces of sidewalls 3. From this position, container closure unit 4 can easily be lifted up and removed from container 2.

Figure 22:
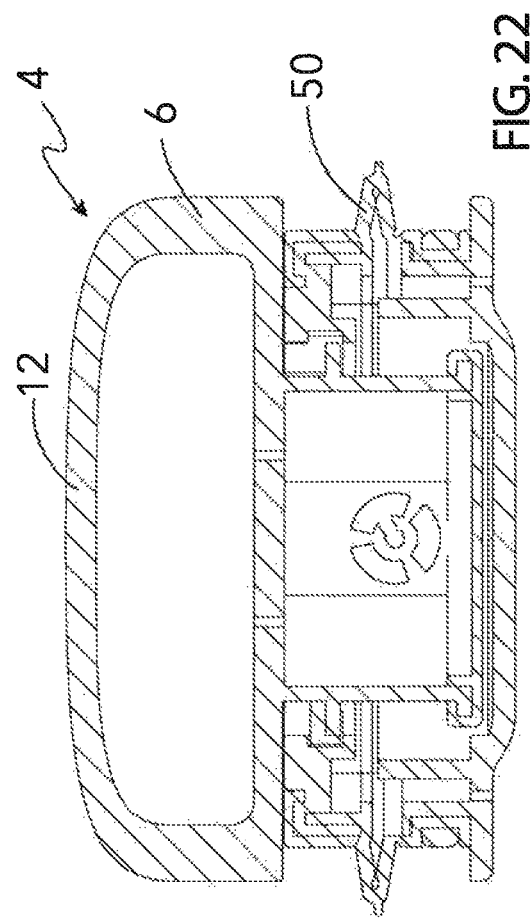
FIG. 22 is a cross-sectional view of the assembled container closure unit of the storage system of the present invention in the closed position.

FIG. 22 is a cross-sectional view of container closure unit 4 in the second or closed position, handle member 6 via its handle component 12 having been pushed down. This causes expandable gasket 50 to be squeezed downward and flattened. As a result, greater contact and friction are created between gasket 50 and the interior surfaces of sidewalls 3, thereby securing container unit 4 in place within container 1, while at the same time creating an air-tight seal within the container.

When handle member 6 is pushed into container 2, air flows through valve 22, located in lower section 14 of the handle member. A "whoosh" of air through the valve is then heard.

Figure 16:
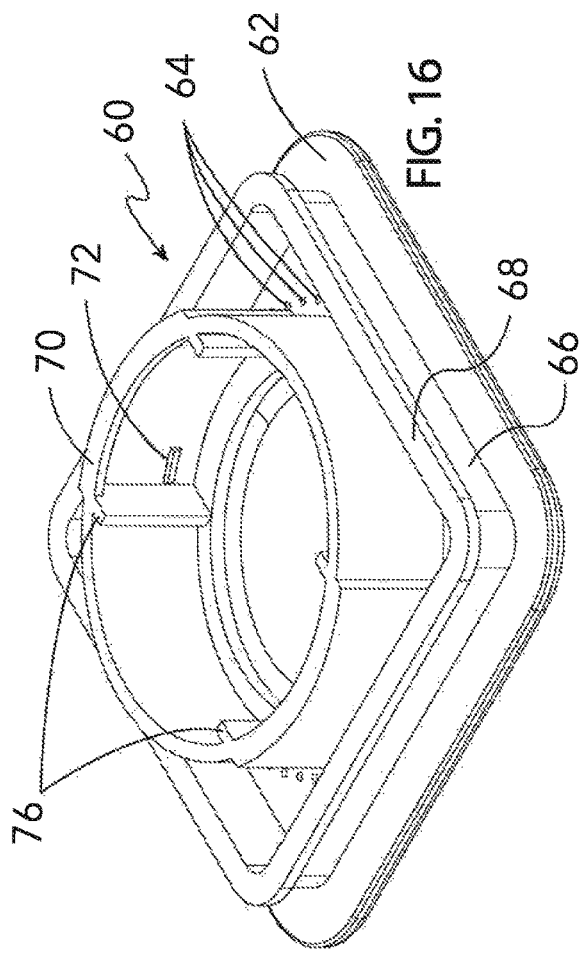
FIG. 16 is a top perspective view of the bottom member of the storage container system of the present invention.
Figure 17:
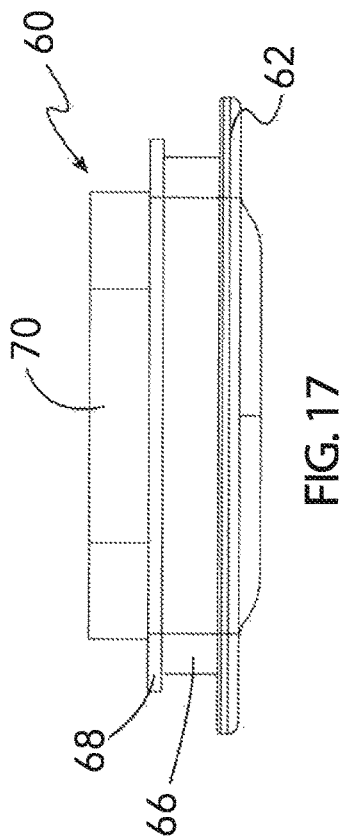
FIG. 17 is an elevation view of the bottom member of the storage container system of the present invention.
Figures 24A, 24B:
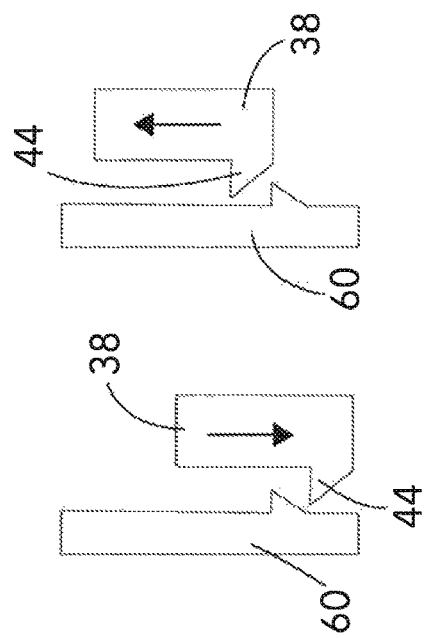
FIGS. 24a and 24b illustrate the container closure unit locking feature of the storage container system of the present invention.
Figure 23:
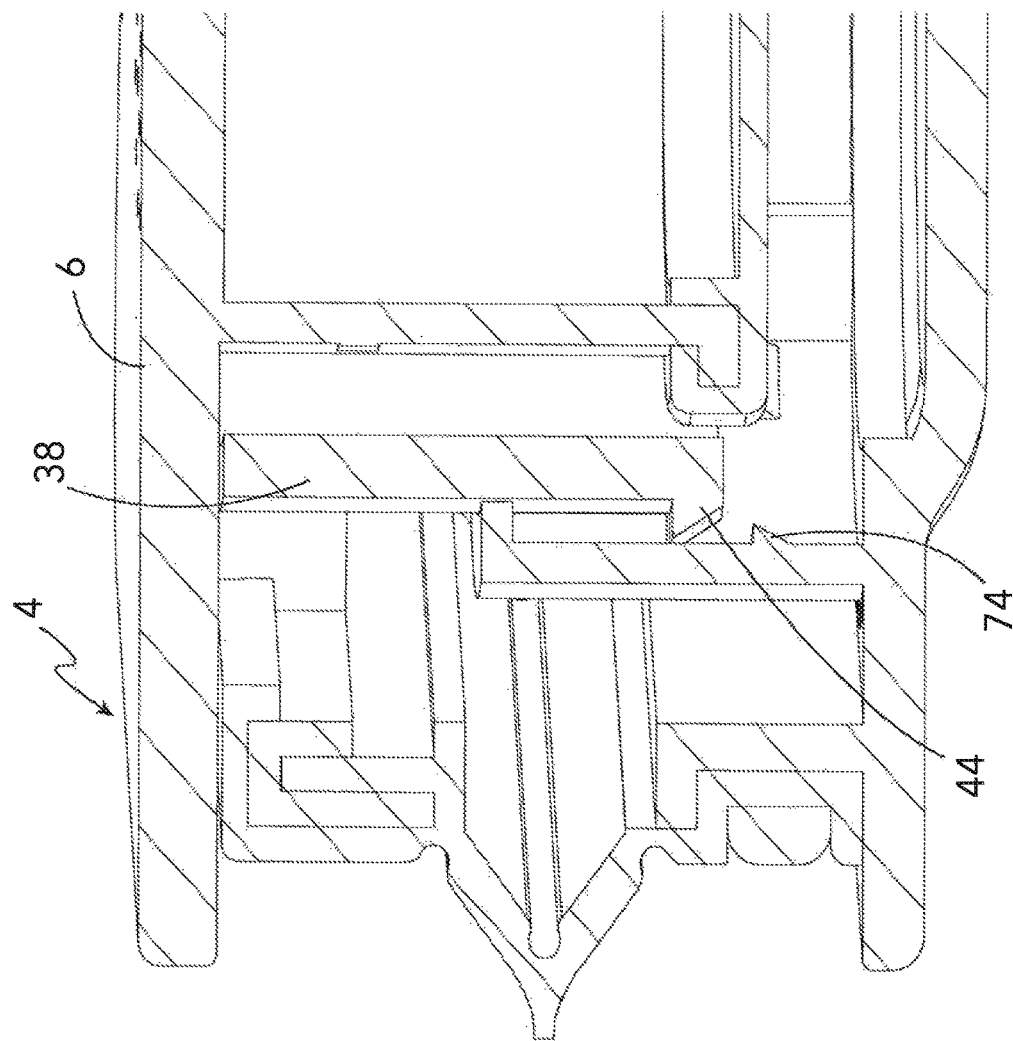
FIG. 23 is a partial, cross-sectional view of the inter-connection of components at the bottom of the storage container system of the present nvention.
Figure 25:
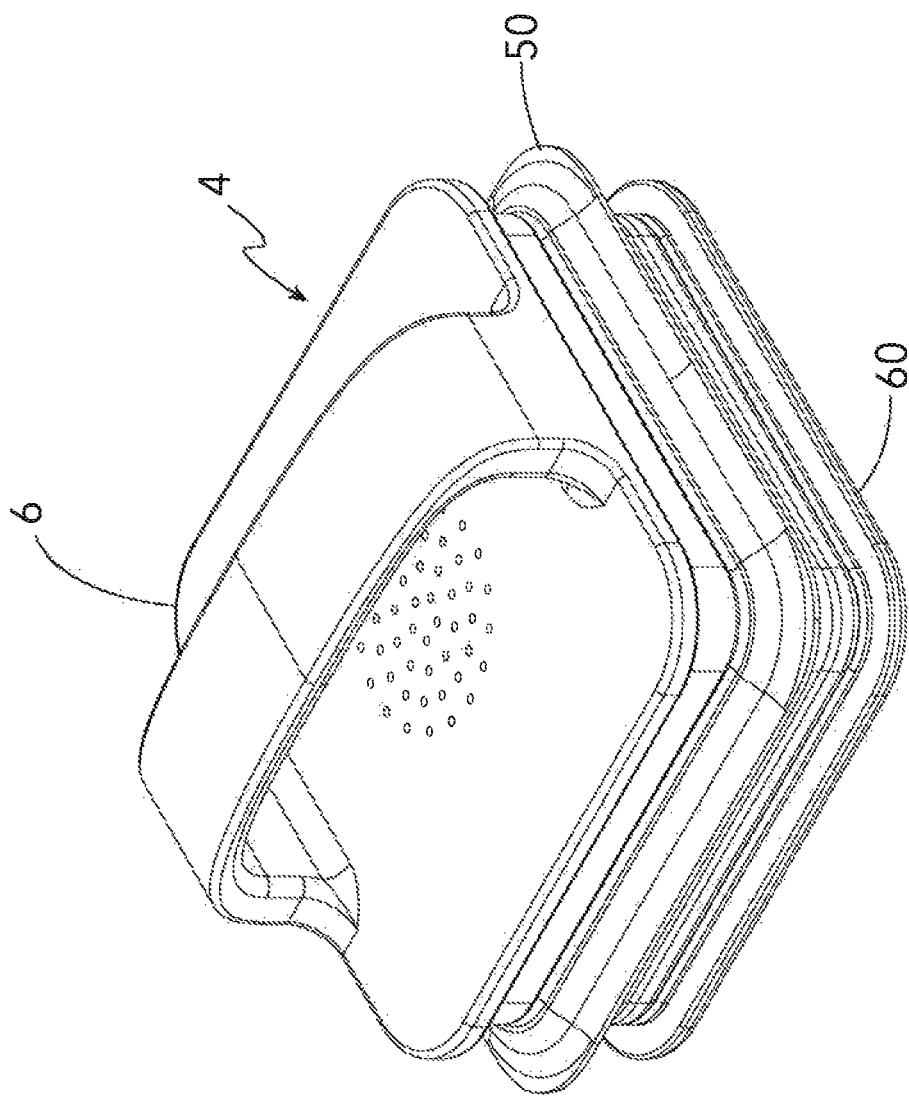
FIG. 25 is a top perspective drawing of the assembled container closure unit of the storage container of the present invention.
Figure 26:
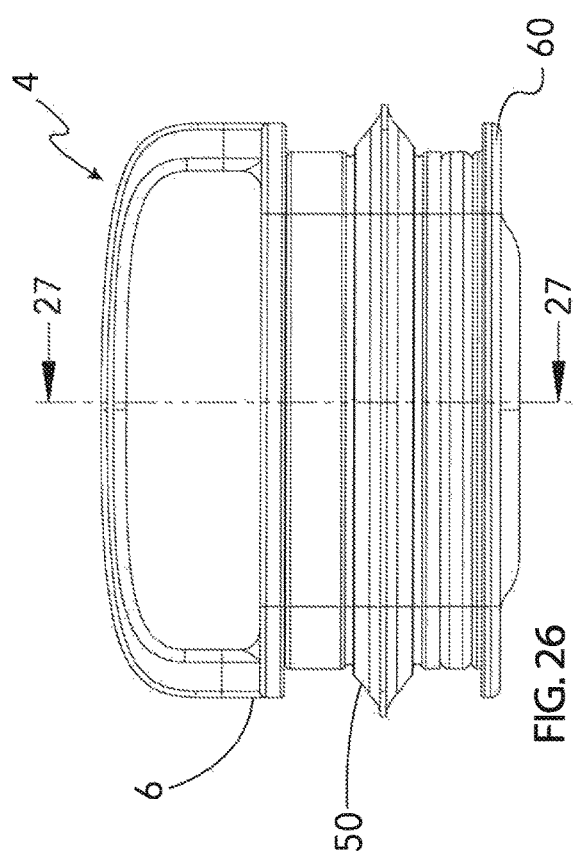
FIG. 26 is an elevation view of the assembled container closure unit of the storage container system of the present invention.
Figure 27:
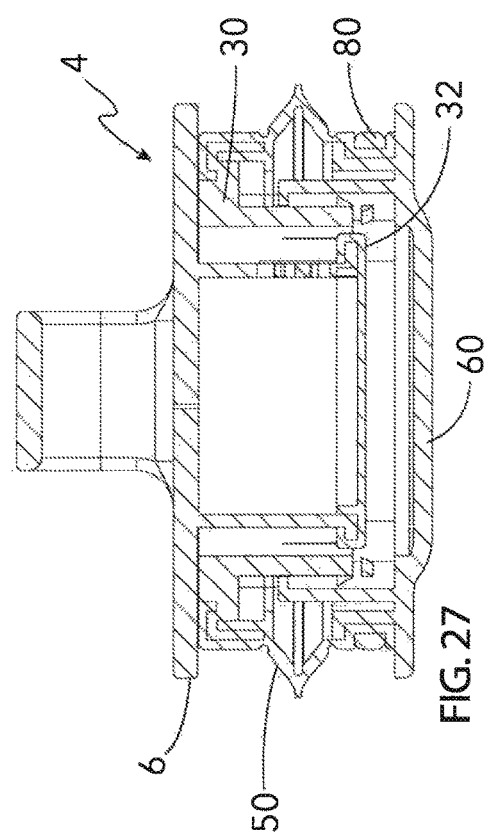
FIG. 27 is a cross-sectional view taken from FIG. 26.
Figure 28:
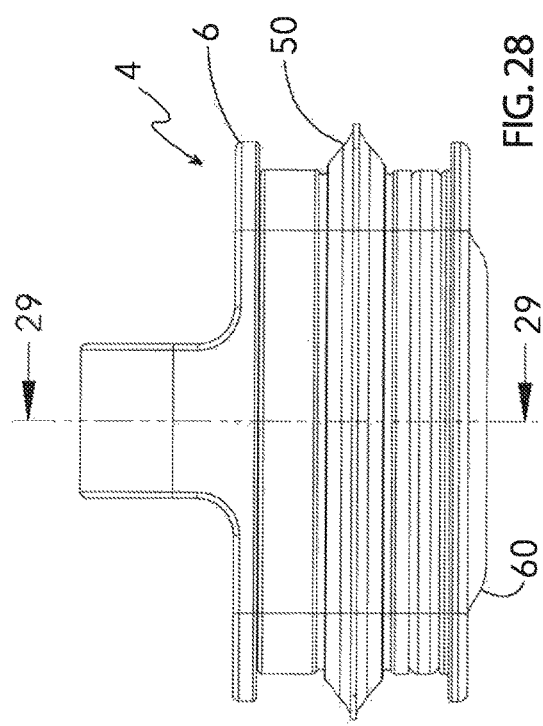
FIG. 28 is an end view of the container closure unit of the storage container system of the present invention.
Figure 29:
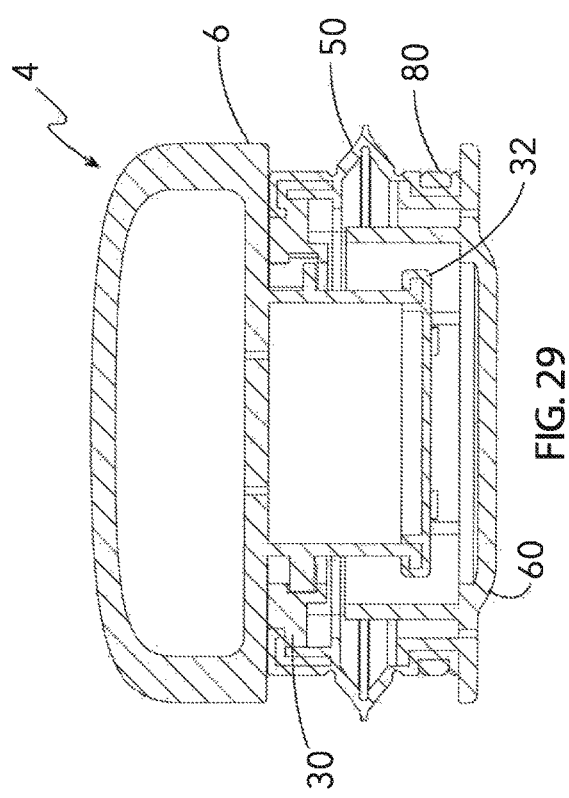
FIG. 29 is a cross-sectional view taken from FIG. 28.

FIGS. 23 and 24a and 24b illustrate the manner container closure unit 4 is kept in a closed position within container 1. When handle component 12 and hence handle member 6 is pushed down, as described with regard to FIGS. 21 and 22 above, locking tab 44 of leg 38 of snap inner piece 30 (and tab 42 of oppositively located leg 40, shown in FIGS. 10 and 11) is compelled over locking element 74 of bottom member 60 (and oppositively located locking element 72, shown in FIG. 16) in order to maintain container closure unit 4 in the down, closed position. See FIG. 24a. When handle component 12 and hence handle member 6 is pulled back up, as seen in FIG. 24b, leg 38 (and leg 40) is raised above locking element 74 (and locking element 72) to allow container closure unit 4 to be lifted up and taken out of container 1.

At the same time handle member 6 of container closure unit 4 is pushed into container 2, the handle member is rotated a quarter turn. This results in ramp locks 16 and 17 which extend from lower section 14, to ride into and along inset locking spaces 46 and 48 within snap inner piece 30 in order to secure handle member 6 to the snap inner piece. An airtight seal within container 2 is thereby established.

Certain novel features and components of this invention are disclosed in detail in order to make the invention clear in at least form thereof. However, it is to be clearly understood that the invention as disclosed is not necessarily limited to the exact form and details as disclosed, since it is apparent that various modifications and changes may be made without departing from the spirit of the invention.

The invention claimed is:

1. An air-tight storage container system comprising:
   a container having an open top and sidewalls with interior surfaces;
   a container closure unit configured to be placed over the open top, said container closure unit comprising:
      a handle member having a flat base, a single handle component attached to the side of and extending upwardly from and over the base, and a hollow, cylindrically shaped lower section extending downwardly from the base, said lower section having a passage extending completely through and spanning the length of the lower section;
      a flexible, deformable gasket member, the gasket member having expanded and flattened configurations;
      a single, snap inner piece component located within the gasket member, the lower section of the handle component being positioned within the snap inner piece component which is located below the base of the handle member; and
      a bottom member, the lower section of the handle member extending through the snap inner piece component and into the bottom member;
   whereby in a first position, the container closure unit is placed within the open top of the container with the gasket member in its expanded configuration, and in a second position, the handle member is pushed down forcing the container closure unit to be compelled downward such that the gasket is in the flattened configuration, compelled against the interior surfaces to create an air-tight seal.

2. The air-tight storage container system as in claim 1 wherein the snap inner piece component comprises at least one locking tab and the bottom member comprises at least one locking element, whereby in the second position the locking tab and locking element engage to maintain the container closure unit in said second position.

3. The air-tight storage container system as in claim 2 wherein the handle member comprises ramp locks and the snap inner piece further comprises locking spaces, whereby while the container closure unit is in the second position, the handle member is rotated to position the ramp locks within the locking spaces in order to secure the handle member to the snap inner piece component.

4. The air-tight storage container system as in claim 1 wherein the handle member comprises ramp locks and the snap inner piece comprises locking spaces, whereby when the container closure unit is in the second position, the handle member is rotated to position the ramp locks within the locking spaces in order to secure the handle member to the snap inner piece component.

\* \* \* \* \*